United States Patent [19]

Sawicki et al.

[11] Patent Number: 5,497,392
[45] Date of Patent: Mar. 5, 1996

[54] SEGMENTED LASING TUBE FOR HIGH TEMPERATURE LASER ASSEMBLY

[75] Inventors: Richard H. Sawicki, Danville; Terry W. Alger, Tracy; Raymond G. Finucane, Pleasanton; Jerome P. Hall, Livermore, all of Calif.

[73] Assignee: The United States of America as represented by the United States Department of Energy, Washington, D.C.

[21] Appl. No.: 381,479

[22] Filed: Jan. 26, 1995

[51] Int. Cl.⁶ ............................................. H01S 3/03
[52] U.S. Cl. .................. 372/62; 372/66; 372/35
[58] Field of Search .................. 372/61, 62, 35, 372/66

[56] References Cited

U.S. PATENT DOCUMENTS

| | | | |
|---|---|---|---|
| 2,457,908 | 1/1949 | Meyerhoefer | 285/163 |
| 2,883,246 | 4/1959 | Hatch | 309/2 |
| 3,452,295 | 6/1969 | Sher | 331/94.5 |
| 3,469,207 | 9/1969 | Solomon et al. | 331/94.5 |
| 3,668,777 | 6/1972 | McMahan | 29/628 |
| 3,705,999 | 12/1972 | Hermann et al. | 313/197 |
| 3,753,144 | 8/1973 | Kearns et al. | 331/94.5 |
| 3,787,781 | 1/1974 | Medicus et al. | 331/94.5 |
| 4,210,389 | 7/1980 | Burkhart et al. | 350/321 |
| 4,242,646 | 12/1980 | Macken | 331/94.5 |
| 4,242,647 | 12/1980 | Macken | 331/94.5 |
| 4,380,077 | 4/1983 | McMahan | 372/62 |
| 4,504,954 | 3/1985 | Güers et al. | 372/61 |
| 4,564,948 | 1/1986 | Golser | 372/61 |
| 4,719,638 | 1/1988 | Carlson et al. | 372/62 |
| 4,734,915 | 3/1988 | Mefferd et al. | 372/62 |
| 4,736,379 | 4/1988 | Barker et al. | 372/34 |
| 4,805,180 | 2/1989 | Maitland et al. | 372/62 |
| 5,311,529 | 5/1994 | Hug | 372/35 |

*Primary Examiner*—Leon Scott, Jr.
*Attorney, Agent, or Firm*—Miguel A. Valdes; William C. Daubenspeck; William R. Moser

[57] ABSTRACT

A high temperature laser assembly capable of withstanding operating temperatures in excess of 1500° C. is described comprising a segmented cylindrical ceramic lasing tube having a plurality of cylindrical ceramic lasing tube segments of the same inner and outer diameters non-rigidly joined together in axial alignment; insulation of uniform thickness surround the walls of the ceramic lasing tube; a ceramic casing, preferably of quartz, surrounding the insulation; and a fluid cooled metal jacket surrounds the ceramic casing. In a preferred embodiment, the inner surface of each of the ceramic lasing tube segments are provided with a pair of oppositely spaced grooves in the wall thereof parallel to the center axis of the segmented cylindrical ceramic lasing tube, and both of the grooves and the center axis of the segmented cylindrical ceramic lasing tube lie in a common plane, with the grooves in each ceramic lasing tube segment in circumferential alignment with the grooves in the adjoining ceramic lasing tube segments; and one or more ceramic plates, all lying in a common plane to one another and with the central axis of the segmented ceramic lasing tube, are received in the grooves to provide additional wall area in the segmented ceramic lasing tube for collision and return to ground state of metastable metal atoms within the segmented ceramic lasing tube.

16 Claims, 3 Drawing Sheets

SEGMENTED LASING TUBE FOR HIGH TEMPERATURE LASER ASSEMBLY

BACKGROUND OF THE INVENTION

The invention described herein arose in the course of, or under, Contract No. W-7405-ENG48 between the United States Department of Energy and the University of California for the operation of the Lawrence Livermore National Laboratory.

In laser isotope separation, a large diameter and long length cylindrical ceramic tube is used to contain the electric discharge which provides excitation for the laser transitions traveling down the tube from a laser source to a target. Typically the tube may be about 3 meters (9.84 feet) in length with an outside diameter of about 8.9 cm. (~3½ inches). The tube must be constructed of a high temperature non-reactive ceramic capable of withstanding operating temperatures as high as 1550° C. without reacting with the metal lasant material, e.g., copper liquid or vapor used as the lasant material.

Forming or fabricating such a laser robe from a single ceramic tube, with any degree of precision in dimensional stability, has been very difficult. Differential shrinkage of the ceramic tube during its formation can result in oval or warped tubes. Furthermore stresses created either during fabrication or during operation can also have a deleterious effect on the dimensional integrity of the ceramic lasing tube. If the inner diameter of the tube does not remain true throughout the entire length of the tube, problems of beam blockage can occur, with a portion of the beam striking the wall, resulting in an energy loss. If the outer diameter of the tube is not maintained, problems can arise in fitting insulation around the tube which is then fitted into a quartz envelope or casing of fixed inner diameter. In the past, such lack of uniformity in the ceramic lasing tube resulted in a need to thin portions of the surrounding insulation to permit installation of the ceramic tube in the insulation. This, in turn has resulted in the formation of cold spots in the laser tube (from such selective thinning of the insulation) resulting in loss of performance of the laser. Dimensional inconsistencies in the inner and outer diameters of the lasing tube also increases the labor cost of assembling other materials around the lasing tube, e.g., insulation, quartz casing, and water-cooled vacuum housing around casing.

Segmented tubes have been previously used in laser technology. For example, Hermann et al. U.S. Pat. No. 3,705,999 discusses the use of oxide-coated metal discs which are rigidly interconnected together for use in a lasing tube; while Solomon et al., in U.S. Pat. No. 3,469,207, discloses the formation of a lasing tube using annular ceramic spacer sections which are brazed together for coaxial alignment. McMahan U.S. Pat. No. 3,668,777 shows an assembly of threaded pyrolytic carbon sections in a laser construction having anisotropic orientation of the carbon sheet from which the sections are formed so that the lasing tube exhibits axial electrical semiconductivity.

It would, however, be desirable to provide a high temperature laser assembly having a dimensionally stable segmented ceramic lasing tube therein wherein the inner and outer diameters of each segment of the lasing tube, as measured from the axis of the tube, would not vary more than ±0.25 millimeters (0.010 inches) along the entire length of the tube.

SUMMARY OF THE INVENTION

In accordance with the invention, a high temperature laser assembly comprises a dimensionally stable segmented ceramic lasing tube having a plurality of cylindrical segments non-rigidly joined together in axial alignment; insulation preferably of uniform thickness surrounding the walls of the ceramic lasing tube; a ceramic casing, preferably of quartz, surrounding the insulation; and a fluid cooled metal jacket surrounding the ceramic casing, and defining a vacuum-tight area therebetween. In a preferred embodiment, the inner surface of the lasing tube segments are provided with a pair of oppositely spaced grooves in the wall thereof parallel to the center axis of the segmented ceramic lasing tube, both grooves and the center axis lying in a common plane, and the grooves in each segment are maintained in circumferential alignment with the grooves in the other segments.

DETAILED DESCRIPTION OF THE INVENTION

Figure 1:
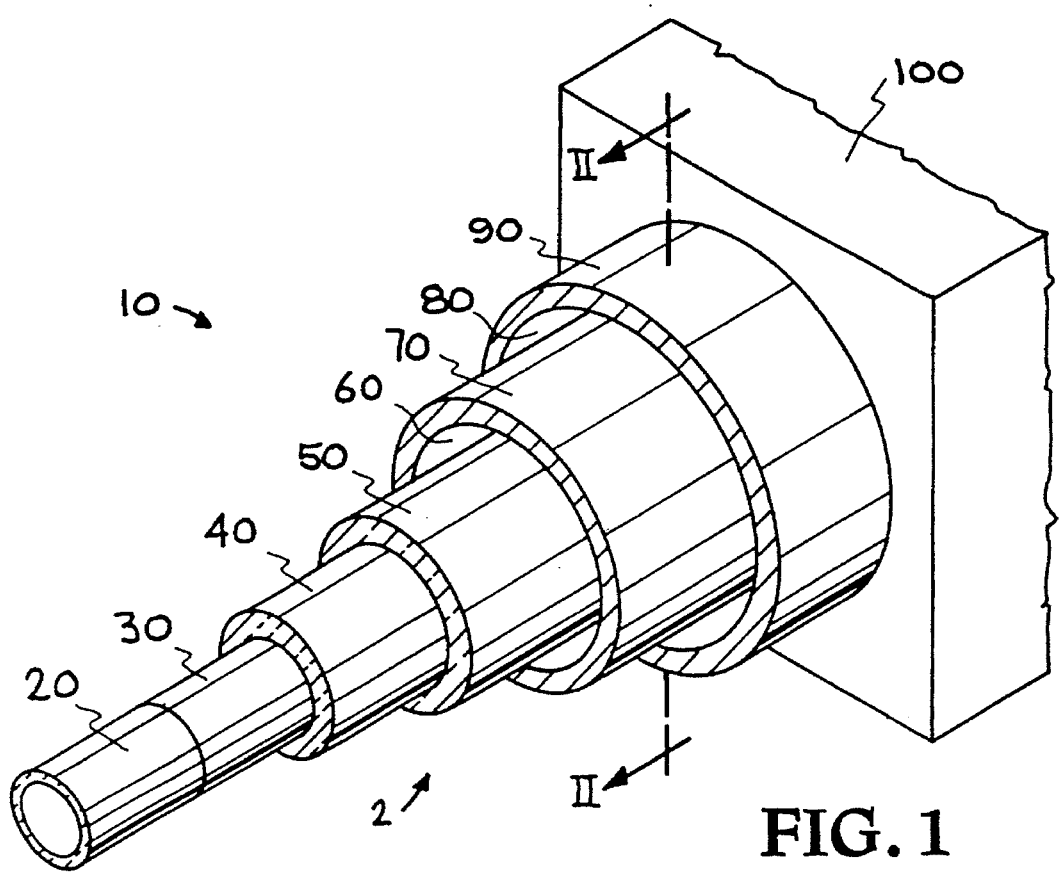
FIG. 1 is a cutaway side view of the high temperature laser assembly of the invention.
Figure 2:
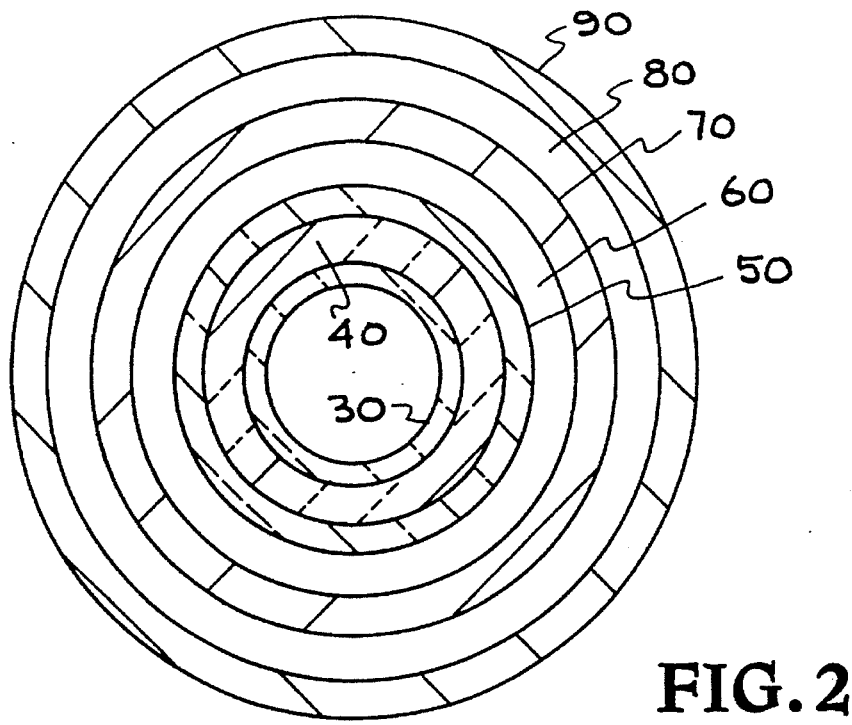
FIG. 2 is a end section view of the assembly of FIG. 1 taken along lines II—II.

Referring now to FIGS. 1 and 2, the laser assembly of the invention is generally shown at 2 comprising a first segment 20 of a segmented cylindrical ceramic lasing tube 10 and a second segment 30 of the segmented ceramic lasing tube shown joined to first segment 20 and in coaxial alignment with first segment 20 to form segmented lasing tube 10. Shown radially surrounding segmented lasing tube 10 is an insulation layer 40 comprising high temperature resistant fibrous ceramic insulation material such as fibrous aluminum material.

Surrounding insulation layer 40 is a cylindrical quartz tube 50 having an inner diameter sufficiently larger than the outer diameter of segmented cylindrical ceramic lasing tube 10 to permit a thickness of insulation layer 40 of about 1 cm (~0.4 inches) to be placed around each of the lasing tube segments to thereby permit segmented cylindrical ceramic lasing tube 10 to be operated at temperatures in access of 1500° C. without damage to quartz tube 50 or loss of laser performance. Surrounding and spaced from quartz tube 50 is an inner cylindrical metal jacket wall 70 which, together with quartz tube 50, defines, in one embodiment, an evacuable annular chamber 60 therebetween, although quartz tube 50 may also define the outer wall of a vacuum chamber. A second or outer cylindrical metal jacket wall 90 surrounds and is spaced from inner metal jacket 70 to define a second annular chamber 80 therebetween which serves as a cooling chamber through which cooling fluid may be circulated. Metal jacket 70 may be divided into two portions to further serve as the coaxial electrodes used to excite the metal vapors present (with inert buffer gases) in segmented cylindrical lasing tube 10, as is well known to those skilled in the art.

In the illustrated application of the lasing tube, the assembly is joined, and each cylindrical component is sealed, at one end to a laser source 100, and at an opposite end to a laser target (not shown). Thus, the resulting sealed annular chamber 60 between quartz tube 50 and inner metal jacket 70 may define an evacuable space which may be connected to a vacuum pump (not shown) and the resulting sealed chamber 80 between inner cylindrical metal jacket 70 and outer cylindrical metal jacket 90 defines a cooling chamber through which a coolant, such as water, may be pumped from a cooling source (not shown). Alternatively, quartz tube 50 may comprise the outer wall of an evacuated enclosure. It will also be recognized that the lasing tube need not be directly attached to either the laser source (as shown) or the target.

While only two segments or portions 20 and 30 of segmented cylindrical lasing tube 10 are illustrated in FIG. 1, in accordance with the invention, segmented cylindrical lasing tube 10 will comprise a plurality of such segments, with each segment not exceeding about 1.5 meters (~4.92 feet), with shorter length segments, each having a length of about 0.5 meters (~1.64 feet), preferred to thereby optimize the dimensional stability available through the use of shorter ceramic lasing tube segments. By providing such high temperature ceramic segments in lengths not exceeding 1.5 meters, and preferably not exceeding about 0.5 meters, each segment may be produced with sufficient dimensional stability and matching reproducibility. That is, each lasing tube segment will have inner and outer diameters, as measured from the axis of the tube, which do not vary more than ±0.25 millimeters (0.010 inches) along the entire length of the lasing tube segment (minimum axial warpage), nor around the entire circumference of the tube wall (roundness or non-ovalness of the lasing tube segment).

Segmented cylindrical lasing tube 10 is formed of a ceramic material capable of withstanding operating temperatures higher than 1500° C., and typically averaging about 1550° C. The particular ceramic material selected must, however, not only be able to withstand such elevated temperatures, but must further be relatively inert to the metal lasant materials, e.g., copper vapors, utilized in forming such a high temperature laser beam, and must not contaminate the gases or vapors present in the lasing tube. A particularly preferred ceramic material is aluminum oxide ($Al_2O_3$). The aluminum oxide should have a purity of at least about 99.5 wt. %. Other ceramic materials which may be used in the construction of segmented cylindrical lasing tube 10 will include aluminum nitride, which should have a comparable purity.

Figure 3:
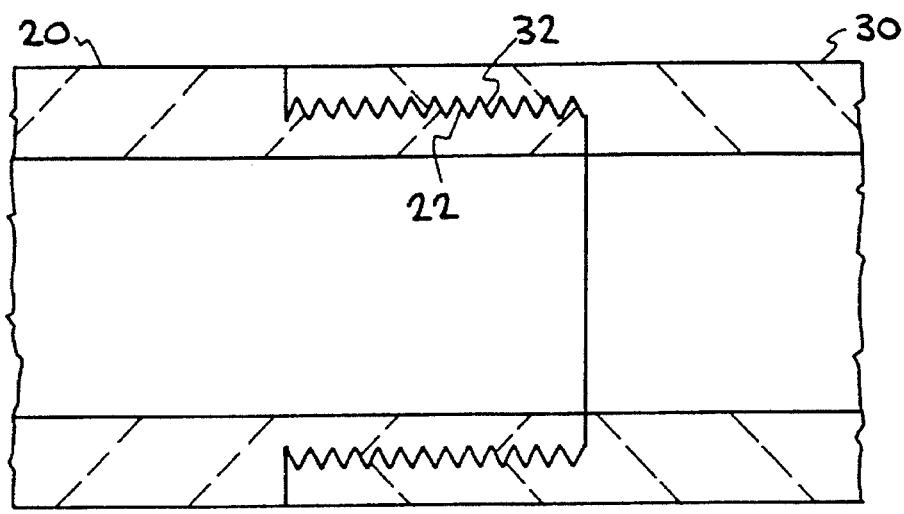
FIG. 3 is a fragmentary side section view showing one fastening mechanism used to non-rigidly retain two adjoining ceramic lasing tube segments in axial alignment.

Turning now to FIG. 3, the preferred embodiment of the non-rigid connecting means is shown comprising a male thread 22 formed in the outer surface of first ceramic lasing tube segment 20 and a matching female thread 32 formed in the inner surface of second ceramic lasing tube segment 30. Male thread 22 of first segment 20 is then inserted into second segment 30 to engage female threads 32 and the two segments are oppositely rotated to thread them together, thereby providing the desired coaxial alignment of the two segments. Each end of each intermediate segment or portion of segmented cylindrical lasing tube 10 is respectively provided with either female or male threads so that each of the segments or portions may be joined in coaxial alignment with the adjoining segment until the desired length and circumferential alignment of segmented cylindrical lasing tube 10 is achieved.

It should be noted that segments 20 and 30 (as well as any additional segments) must not be tightly screwed together to permit some lateral movement during thermal expansion of the ceramic segments during heating. It should be further noted that it is not necessary to provide a seal between segments 20 and 30, since segmented cylindrical lasing tube 10 is located within an evacuated housing. However, it is desirable that the copper vapors be inhibited from migration through the joint into the insulation which surrounds tube segments 20 and 30, since loss of the metal vapor represents a performance loss and the metal vapors may degrade the insulation. It has been found that the matching threaded surfaces of tube segments 20 and 30 provide a sufficiently tortuous path to provide the desired inhibition of migration of the metal vapors into the insulation. The tortuous path provided by matching threads 22 and 32 have been found to provide a sufficient inhibition to the migration of the copper metal vapors from the lasing tube into the insulation to provide acceptable insulation lifetime.

Figure 4:
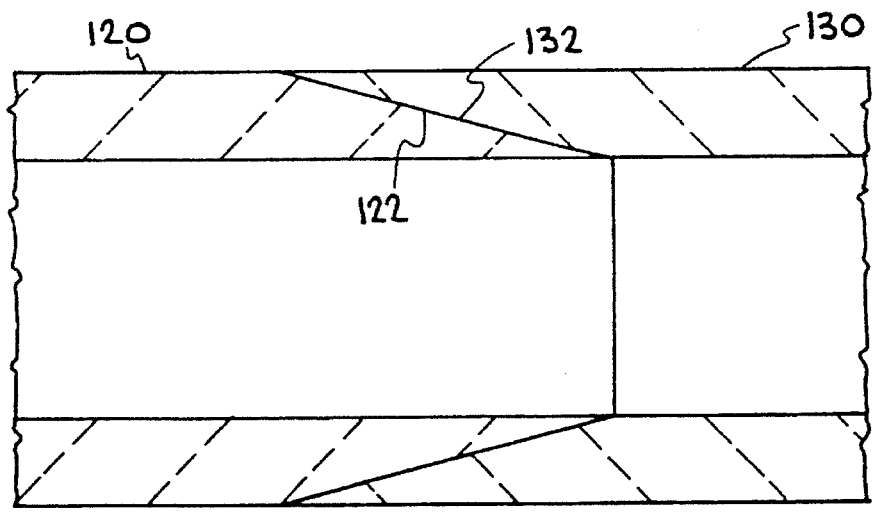
FIG. 4 is a fragmentary side section view showing a second fastening mechanism used to non-rigidly retain two adjoining ceramic lasing tube segments in axial alignment.

FIG. 4 shows an alternate embodiment wherein a first segment 120 of a segmented cylindrical ceramic lasing tube 110, constructed of the same material and dimensional stability as segmented ceramic lasing tube 10, is provided with a tapered outer surface 122 adjacent one end thereof. Second segment 130 is provided with a matching inner tapered surface 132 on its inner surface at one end of the tube segment. The male tapered surface 122 on the outer surface of first segment 120 is then inserted into the end of second tube segment 130 provided with the complimentary female tapered surface on its inner surface to provide the desired coaxial alignment of tube segments 120 and 130. Again, as in the prior embodiment, the two segments should not be tightly coupled together to permit some lateral movement during thermal expansion of the respective tube segments. The added path length defined by the matching tapers again provides a long and constricted path length for the copper metal vapors to traverse before reaching the insulation, while also providing the desired coaxial alignment between adjoining lasing tube segments.

Figure 5:
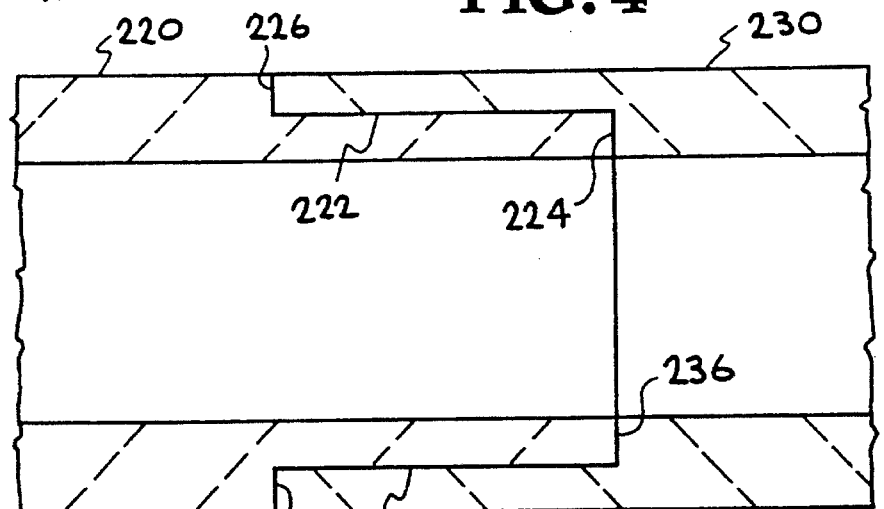
FIG. 5 is a fragmentary side section view showing a third fastening mechanism used to non-rigidly retain two adjoining ceramic lasing tube segments in axial alignment.

FIG. 5 shows yet another embodiment wherein a segmented cylindrical ceramic lasing tube 210, also constructed of the same material and dimensional stability as ceramic lasing tube 10, comprises a series of segments including a first segment 220 having an annular external cutaway portion 222 formed in the outer surface commencing at segment end 224 and terminating in a shoulder 226. A corresponding inner annular cutaway portion 232 is formed in the inner surface of lasing tube segment 230 commencing at end 234 and terminating in an inner shoulder 236 formed at approximately the same distance from end 234 as shoulder 226 is from end 224. The depth of external cutaway portion 222, i.e., the O.D. of cutaway portion 222, should be at least as deep as the depth or I.D. of internal cutaway portion 232 to thereby permit cutaway portion 222 of segment 220 to slip into cutaway portion 232 of segment 230.

Figure 6:
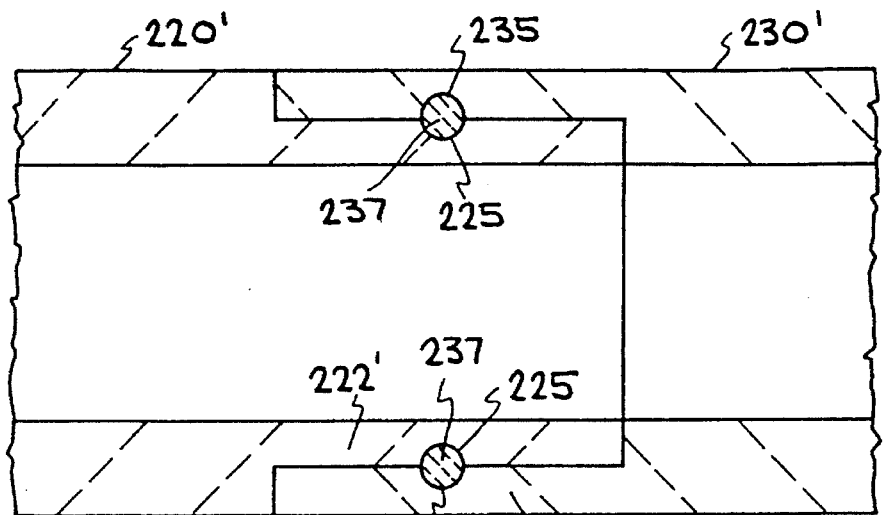
FIG. 6 is a fragmentary side section view of a modification of the fastening mechanism illustrated in FIG. 5 showing matching annular grooves formed in the cutaway portions of the lasing tube segments into which an uncured ceramic material may be placed to cure and form a retention ring in the matching annular grooves.

FIG. 6 shows a variation of the embodiment of FIG. 5 wherein an annular groove 225 is formed in external cutaway portion 222' of segment 220' and a matching annular groove 235 is formed in the positionally corresponding surface of internal cutaway portion 232' of segment 230' to thereby define a generally circular opening, e.g., semicircular shapes in grooves 225 and 235, as shown in FIG. 6, would form a generally circular opening. Uncured ceramic material, i.e., green ceramic in paste form, and preferably comprising the same ceramic material as comprises ceramic segmented lasing tube 210', is then placed in grooves 225 and 235 and cured to form a single retention ring 227 which locks ceramic lasing tube segments 220' and 230' together.

Figure 7:
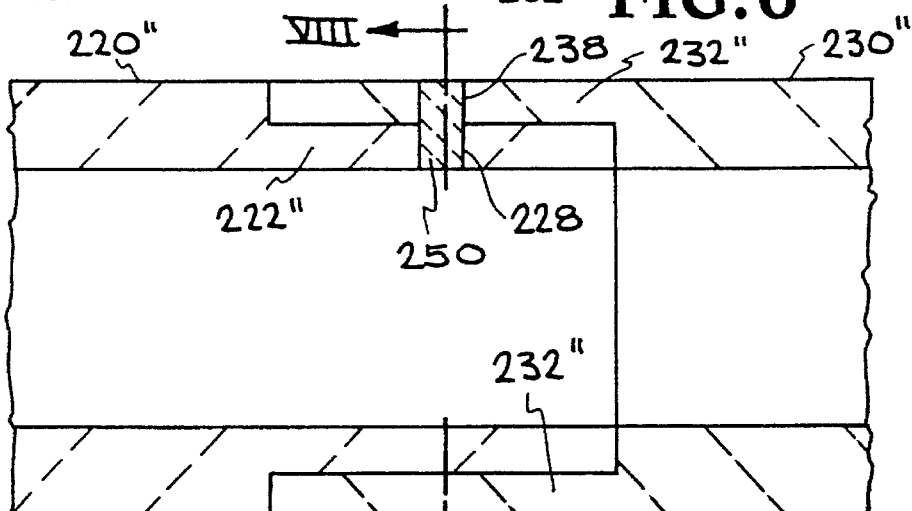
FIG. 7 is a fragmentary side section view of another modification of the fastening mechanism illustrated in FIG. 5 to non-rigidly retain two adjoining ceramic lasing tubes in both axial and radial alignment.

In the side section view of FIG. 7, another variation of the embodiment of FIG. 5 is shown which provides for circumferential as well as coaxial alignment of the lasing tube segments of the invention. In this embodiment, cutaway portion 222" of first segment 220" of segmented lasing tube 210" is provided with a lateral opening or bore 228 and cutaway portion 232" of second segment 230" is provided with a matching bore 238 of the same diameter (if circular) or cross-sectional shape (if non-circular). A pin 250, having the same diameter or cross-sectional shape as bores 228 and 238 and a length equal to or less than (but usually not greater than) the total combined depths of bores 228 and 238, is received in bores 228 and 238 to thereby retain segments 220" and 230" together, not only in axial alignment, but also in circumferential alignment as well.

Figures 8, 9:
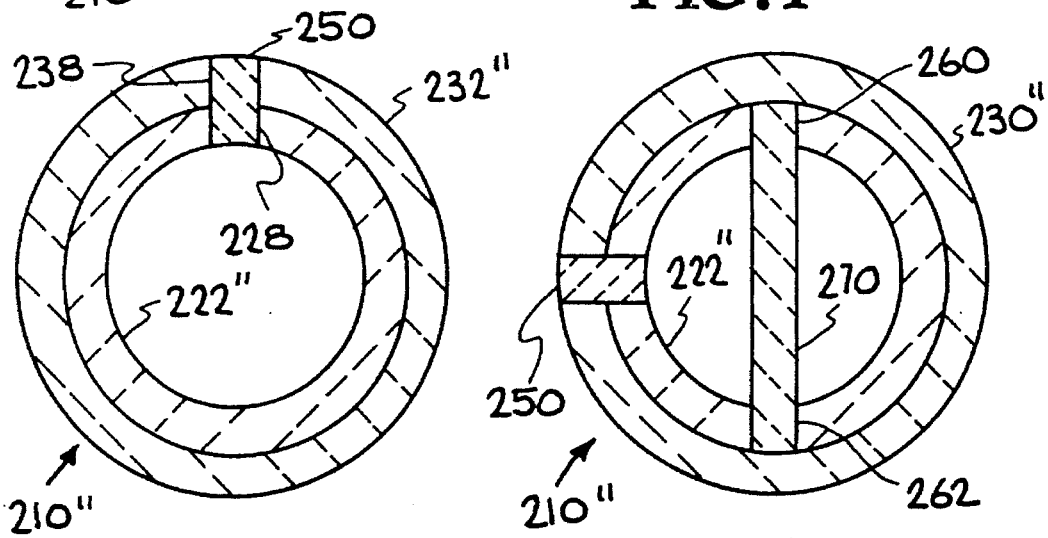
FIG. 8 is an end section view of the structure of FIG. 7 taken along lines VII—VII.
FIG. 9 is an end section view showing the placement of spaced laterally extending grooves in opposite positions in the inner wall of the lasing tube and the retention of a plate in the grooves in the tube wall.

The construction shown in FIG. 7, as described above, permits the formation of a pair of oppositely spaced apart grooves 260 and 262, as shown in the end section view of FIG. 9, extending laterally along the inside wall of each of the lasing tubes segments, i.e., parallel to the axis of each lasing tub segment, with the grooves in one lasing tube segment maintained by pin 250 in circumferential alignment with the grooves of an adjoining lasing tube segment coupled thereto. The purpose of grooves 260 and 262 is to receive therein one or more ceramic plates 270, preferably formed of the same ceramic material as lasing tube segments 220" and 230". Plate 270 is located within lasing tube 210" to provide an additional wall surface with which metastable states of activated metal atoms, e.g., copper atoms in a metastable state, may collide to return then to the ground state so that such metal atoms may be reexcited within the lasing tube.

Plate 270 may comprise a single plate, having a width greater than the I.D. of each lasing tube segment, but less than the combined distance from the depth of groove 260 to the depth of opposite groove 262 (to thereby permit plate 270 to be received— and retained—in grooves 260 and 262). A series of plates 270 may also be used wherein the sum total of the combined length of all of the plates 270 does not exceed the total length of segmented lasing tube 210". Or plates 270 may each having a distance less than the length of a single segment, e.g., less than the length of segment 220". Typically the plate lengths are much less than the length of a segment of tube.

However, it must be noted that it is important that plate 270, or a series of plates 270, lie in a single plane which also passes through the axis of segmented lasing tube 210". This permits limited extension of the total wall surface with which the metal atoms will come in contact, without, however, providing random positioning of the plates which, while providing the desired extension of the wall surface, would also serve to unduly interfere with the travel of the laser beam down the lasing tube. Hence the need for the circumferential alignment of the lateral grooves in adjoining segments of the segmented ceramic lasing tube.

Thus, the high temperature laser assembly of the invention provides dimensional stability wherein a plurality of cylindrical ceramic lasing tube segments may be each formed in more precise form having inner and outer diameters which do not vary more than about ±0.25 millimeters (0.10 inches) along the length of each segment; and then joined together in coaxial alignment to form a segmented lasing tube of extended length; and preferably formed with lateral grooves on the inner walls of the segments, with the cylindrical segments further joined together in circumferential alignment with one another, so that one or more plates received in the lateral grooves may be mounted within the segmented lasing tube in a single plane therein.

While specific embodiments of the segmented lasing tube assembly of the invention has been illustrated and described, modifications and changes of the apparatus, parameters, materials, etc. will become apparent to those skilled in the art, and it is intended to cover in the appended claims all such modifications and changes which come within the scope of the invention.

What is claimed is:

1. A high temperature lasing tube for a metal vapor laser comprising:

a plurality of cylindrical ceramic lasing tube segments of the same inner and outer diameters;

means for coupling said segments together in coaxial alignment to form a segmented cylindrical ceramic lasing tube, said means for coupling including adjoining segments having overlapping ends that accommodate thermal expansion anti also inhibit migration of metal vapor from a metal lasant material disposed in said lasing tube through said coupling means during laser operation; and said overlapping ends having aligned bores to receive a pin to permit said segments to be maintained in circumferential alignment.

2. The high temperature lasing tube of claim 1 wherein each of said segments has inner and outer diameters, as measured from the center axis of said segment, which do not vary more than ±0.25 millimeters (0.10 inches) along the entire length of said lasing tube.

3. The high temperature lasing tube of claim 1 wherein each of said segments has a length not exceeding 1.5 meters.

4. The high temperature lasing tube of claim 1 wherein each of said segments has a length not exceeding 0.75 meters.

5. The high temperature lasing tube of claim 1 wherein each of said overlapping ends is threaded to permit said segments to be threadedly joined together in coaxial alignment to one an other.

6. The high temperature lasing tube of claim 1 wherein said overlapping ends are an inwardly tapered end and an outwardly tapered end to permit said segments to be joined together in coaxial alignment to one another by inserting the outwardly ropered end of one of said segments into the inwardly tapered end of said adjoining segment.

7. The high temperature lasing tube of claim 1 wherein said overlapping ends are:

a) an outer cutaway portion of the outer surface at the end of one segment terminating in a shoulder a fixed distance from said end of said segment; and b) an inner cutaway portion of the inner surface at the end of an adjoining segment terminating in an inner shoulder said same fixed distance from said end to permit said segments to be joined together in coaxial alignment to one another by inserting said cutaway portion of said one segment into said cutaway portion of said adjoining segment.

8. The high temperature lasing tube of claim 7 wherein said overlapping ends have matching annular grooves for receiving curable ceramic retention means therein to retain said laser tube segments joined together.

9. The high temperature lasing tube of claim 1 wherein the inner surface of each of said segments is provided with a pair of oppositely spaced grooves in the wall thereof parallel to said center axis of said lasing tube, wherein both said grooves and said center axis lie in a common plane, and said grooves in each of said ceramic lasing tube segments are in circumferential alignment with grooves in other segments of said lasing tube.

10. The high temperature lasing tube of claim 9 wherein one or more flat ceramic plates, lying in a common plane with said axis of said lasing tube, are received and retained in said circumferentially aligned oppositely spaced grooves in said segments to provide an additional surface in said lasing tube with which activated metal atoms may collide.

11. A high temperature laser assembly for withstanding operating temperatures in excess of 1500° C. having a segmented cylindrical ceramic lasing tube therein which comprises:

a) a plurality of cylindrical lasting tube segments each having the same inner diameter and the same outer diameter as an adjoining ceramic lasing tube segment, each of said ceramic lasing tube segments having inner and outer diameters, as measured from the center axis of said ceramic lasing tube segment, which do not rarer more than ±0.25 millimeters (0.10 inches) along the entire length of said lasing tube segment, and from the respective inner and outer diameters of adjoining ceramic lasing tube segments;

b) threaded means on the respective ends of adjoining ceramic lasing tube segments for joining said segments together in coaxial alignment with one another to form said segmented cylindrical ceramic lasing tube, said threader means having aligned bored means to receive a pin to permit said ceramic lasing tube segments to be maintained in circumferential as well as coaxial alignment;

c) insulation of uniform thickness surrounding the outer wall of said segmented ceramic lasing tube;

d) a ceramic casing surrounding said insulation for retaining said insulation and forming a wall of a vacuum-tight chamber; and e) a fluid cooled metal jacket means surrounding said ceramic casing.

12. A high temperature laser assembly for withstanding operating temperatures in excess of 1500° C. having a segmented cylindrical ceramic lasing tube therein which comprises:

a) a plurality of cylindrical lasing tube segments each having the same inner diameter and the same outer diameter as an adjoining ceramic lasing tube segment, each of said ceramic lasing tube segments having inner and outer diameters, as measured from the center axis of said ceramic lasing tube segment, which do not vary more than ±0.25 millimeters (0.10 inches) along the entire length of said lasing tube segment; anti from the respective inner and outer diameters of adjoining ceramic lasing tube segments;

b) one or more of said ceramic lasing tube segments provided with an external cutaway end portion;

c) one or more of said ceramic lasing tube segments adjoining said one or more ceramic lasing tube segments having external cutaway end portions other of said ceramic lasing tube segments being provided with internal cutaly end portions for receiving said external cutaway portions, to thereby provide for joining said ceramic lasing tube segments together in coaxial alignment with one another to form said segmented lasing ceramic tube, said internal and external cutaway portions having bore means to receive a pin to permit said ceramic lasing tube segments to be maintained in circumferential as well as coaxial alignment to one another;

d) insulation of uniform thickness surrounding the outer wall of said segmented ceramic lasing tube;

e) a ceramic casing surrounding said insulation for retaining said insulation and forming a wall of a vacuum-tight chamber; and f) a fluid cooled metal jacket means surrounding said ceramic casing.

13. The high temperature laser assembly of claim 12 wherein the inner surface of each of said ceramic lasing tube segments is provided with a pair of oppositely spaced grooves in the wall thereof parallel to said center axis of said segmented cylindrical ceramic lasing tube, wherein both said grooves and said center axis lie in a common plane, and said grooves in each of said ceramic lasing tube segments are in circumferential alignment with grooves in other segments of said segmented cylindrical ceramic lasing tube.

14. The high temperature laser assembly of claim 13 wherein one or more flat ceramic plates, lying in a common plane with said axis of said segmented cylindrical ceramic lasing tubes, are received and retained in said circumferentially aligned oppositely spaced grooves in said ceramic lasing tube segments.

15. The high temperature laser assembly of claim 14 wherein each of said ceramic lasing tube segments has a length not exceeding 1.5 meters.

16. The high temperature laser assembly of claim 14 wherein each of said ceramic lasing tube segments has a length not exceeding 0.75 meters.

* * * * *